MECHANISM FOR HANDLING BILLETS AND THE LIKE

Filed Aug. 1, 1952

6 Sheets-Sheet 1

INVENTOR.
RICHARD W. YOUNG
BY
Norman S. Blodgett
ATTORNEY

MECHANISM FOR HANDLING BILLETS AND THE LIKE

Filed Aug. 1, 1952 6 Sheets-Sheet 2

INVENTOR.
RICHARD W. YOUNG
BY
Norman S. Blodgett
ATTORNEY

Sept. 4, 1956 R. W. YOUNG 2,761,561

MECHANISM FOR HANDLING BILLETS AND THE LIKE

Filed Aug. 1, 1952 6 Sheets-Sheet 3

INVENTOR
RICHARD W. YOUNG

BY Norman S. Blodgett
ATTORNEY

MECHANISM FOR HANDLING BILLETS AND THE LIKE

Filed Aug. 1, 1952 6 Sheets-Sheet 4

INVENTOR.
RICHARD W. YOUNG
BY
Norman S. Blodgett
ATTORNEY

Sept. 4, 1956 R. W. YOUNG 2,761,561

MECHANISM FOR HANDLING BILLETS AND THE LIKE

Filed Aug. 1, 1952 6 Sheets-Sheet 5

INVENTOR.
RICHARD W. YOUNG
BY Norman S. Blodgett
ATTORNEY

MECHANISM FOR HANDLING BILLETS AND THE LIKE

Filed Aug. 1, 1952 6 Sheets-Sheet 6

INVENTOR.
RICHARD W. YOUNG
BY Norman S. Blodgett
ATTORNEY

United States Patent Office 2,761,561

Patented Sept. 4, 1956

2,761,561

MECHANISM FOR HANDLING BILLETS AND THE LIKE

Richard W. Young, Worcester, Mass., assignor to Morgan Construction Company, Worcester, Mass., a corporation of Massachusetts Application August 1, 1952, Serial No. 302,180

10 Claims. (Cl. 209—122)

This invention relates to apparatus for handling billets and the like and more particularly to a mechanism for selectively turning or discarding large metal bars, billets, and plates.

In the fabrication of metals it is often necessary to turn or discard individual members of a series of bars or billets which are being moved successively through the mill. In the rolling of steel, for instance, the billet leaves the unscrambling skids and passes onto a conveying mechanism on its way to the heating furnace. At that time it may be necessary to discard an individual billet because it is bent or warped in such a manner that it will not pass through the furnace in the desired manner. At times it may be desirable to turn a billet so that it lies on another side; this would be true if the ends of the billet had been bent downwardly at a previous time so that it would not slide easily in the furnace, but would slide satisfactorily if it were turned completely over. Such discarding and turning operations may be desirable between the furnace and the first stand of the rolling mill if the process of heating in the furnace has warped or bent a billet and also in order to remove scale which has accumulated on the upper surface. In the past, such operations have been performed by hand, since no satisfactory means has ever been devised for doing so by mechanical means. The present invention performs these functions in a novel and useful manner.

It is therefore an outstanding object of the present invention to provide an apparatus for discarding and turning heavy elongated metal objects.

It is another object of this invention to provide a discard and turnover mechanism which will operate efficiently with all sizes and shapes of metal stock.

Another object of the invention is to provide a mechanism for remotely handling bars, billets, plates, and the like in a rolling mill.

A further object of the instant invention is the provision of a means to be used in conjunction with a conveyor for positively handling, turning, or discarding elongated metal members which are moving longitudinally therealong.

Figure 1:
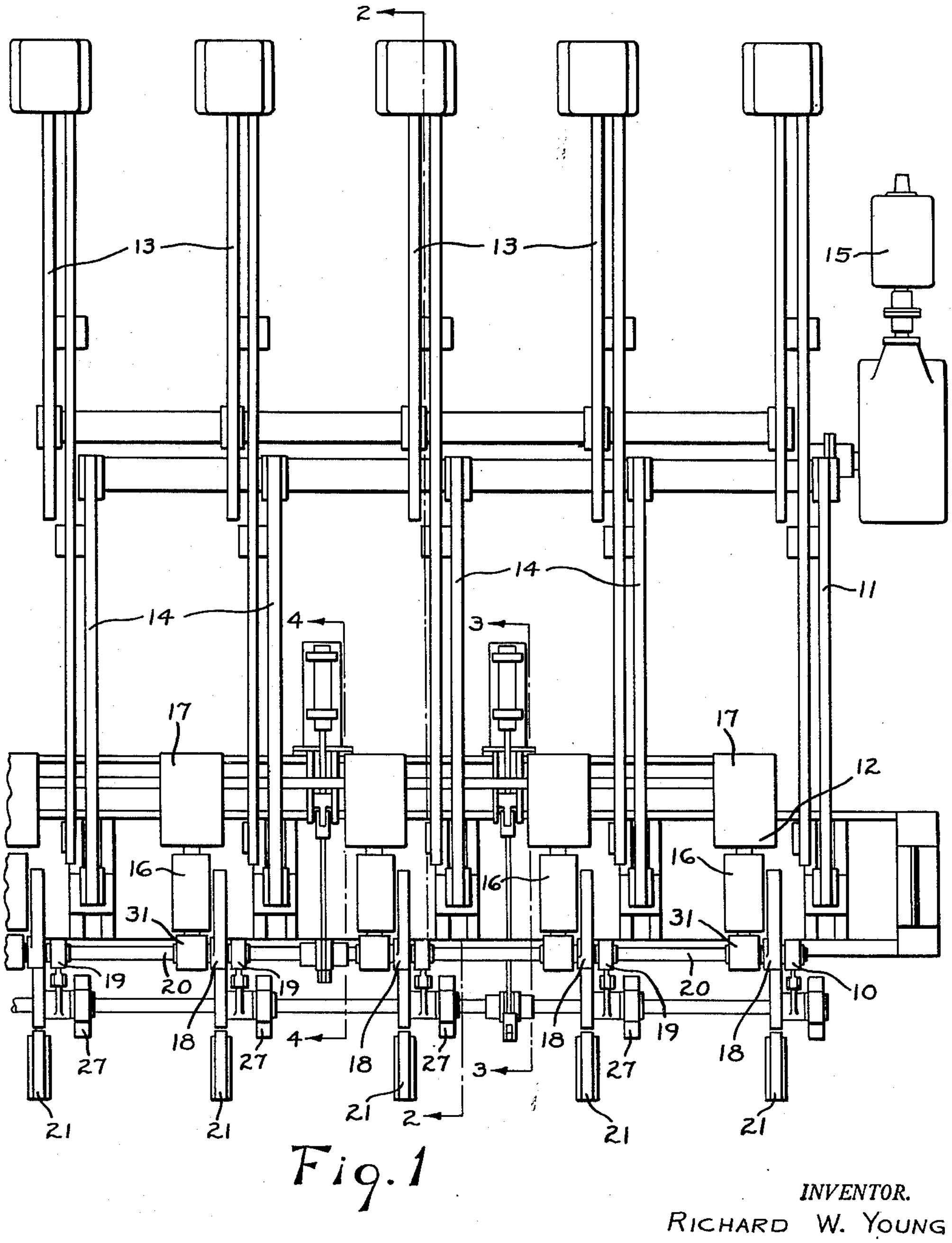
Figure 2:
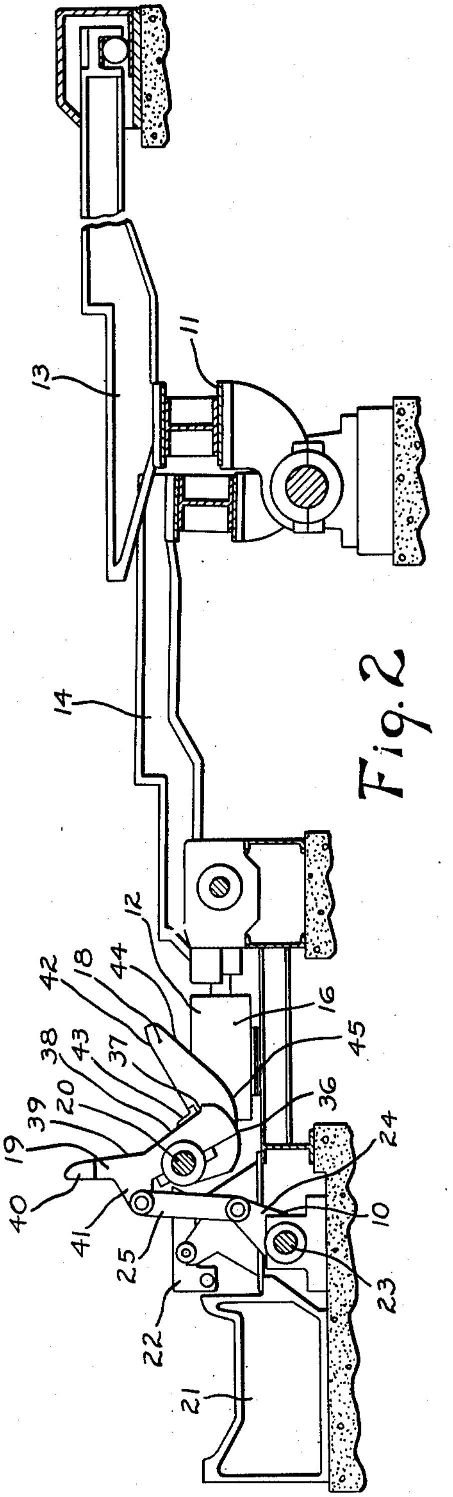
Figure 4:
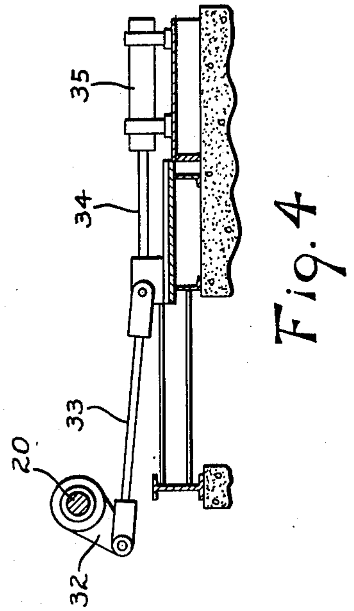
Figure 3:
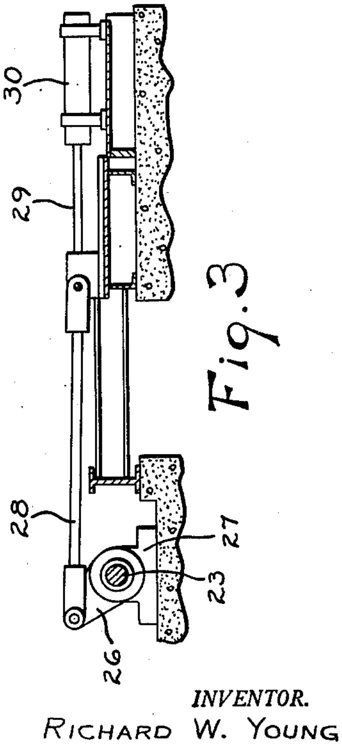
Figure 5:
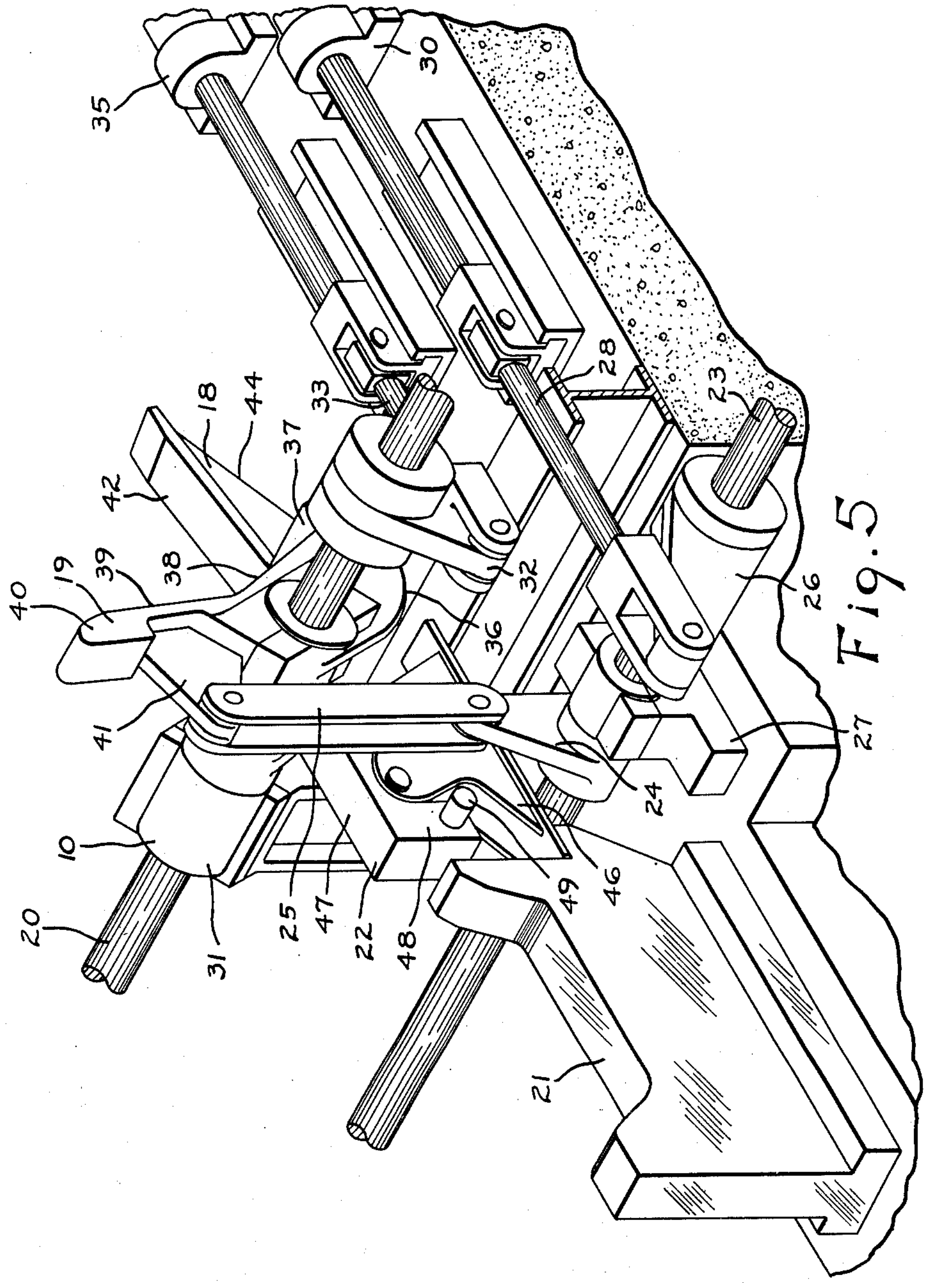

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Figure 1 is a plan view of apparatus embodying the present invention,

Figure 2 is a vertical sectional view of the invention and associated apparatus taken on the line 2—2 of Figure 1, Figure 3 is a vertical sectional view of a portion of the invention taken on the line 3—3 of Figure 1 with parts broken away for sake of clarity, Figure 4 is a vertical sectional view of a portion of the invention taken on the line 4—4 of Figure 1, and Figure 5 is a perspective view of certain important elements of the invention.

Figures 6, 7, 8:
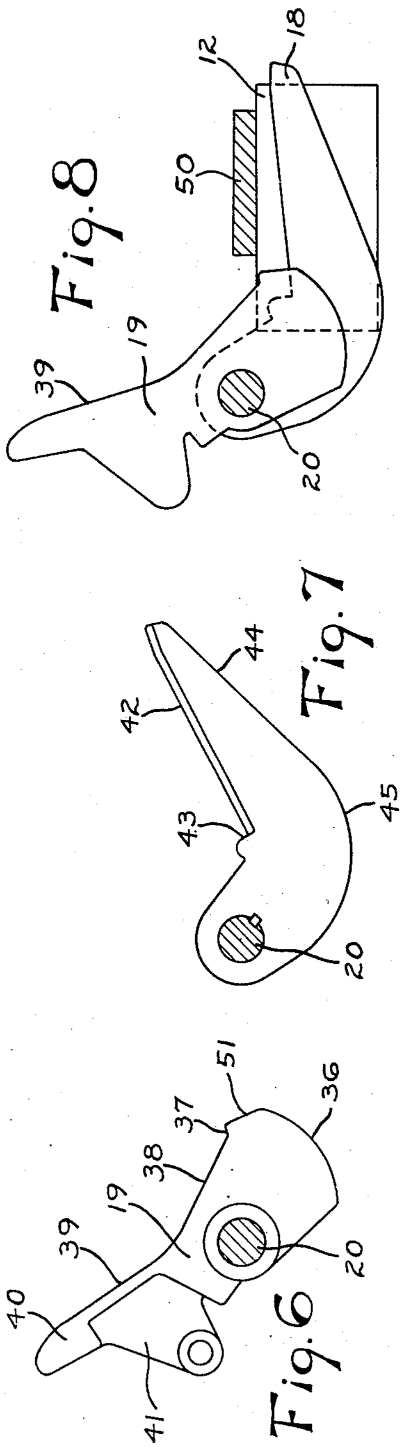

Figures 6 and 7 are elevational views of important elements of the invention.

Figures 8 through 19, inclusive show various positions of the elements of the invention during certain manipulating operations.

Like reference characters denote similar parts in the several figures of the drawings.

Referring first to Figure 1, wherein is best shown the general aspects of the invention, the mechanism for handling billets, designated generally by the reference numeral 10, is shown in use in conjunction with a billet skid apparatus 11 and a roller conveyor 12. The billet skid apparatus 11 is of the type shown and described in the patent to Myles Morgan No. 2,597,944 which issued on May 27, 1952; it consists of a series of upper shuffle bars 13 and lower shuffle bars 14 arranged in side-by-side relation and driven through eccentric means, not shown, by a motor 15. The roller conveyor 12 is of a well-known type having rollers 16 mounted for rotation on horizontal axes and driven through gear boxes 17; the conveyor is mounted adjacent the outer end of the lower shuffle bars 14 of the billet skid apparatus in a position to receive billets discharged broadside from the billet skid apparatus and to move them longitudinally toward the heating furnace, not shown. The mechanism 10 of the invention is composed of a series of lifting arms 18 and camming arms 19 mounted on a shaft 20. On the side of the mechanism 10 opposite to the conveyor 12 are discard racks 21.

The relationship between the billet skid apparatus 11, the roller conveyor 12, the mechanism 10, and the discard racks 21 is shown particularly well in Figure 2. The particular shape of the lifting arm 18 and the camming arm 19 is shown clearly in this view. Also evident in this view is a rocker arm 22 which forms a part of the invention. A horizontal shaft 23 is mounted in the mechanism for rotation and a crank arm 24 is keyed thereto to partake of the same motion. A link 25 connects the outer end of the crank arm 24 to the camming arm 19 for the actuation thereof.

Figure 3 shows the manner of actuation of the shaft 23 for the ultimate movement of the camming arm 19. The shaft 23 is rotatably mounted in bearings 27 and a crank arm 26 is keyed at one end thereto. The outer end of the crank arm 26 is pivotally attached to a connecting rod 28 which extends generally horizontally and rearwardly to the piston rod 29 of an actuating cylinder 30 rigidly fixed to the foundation. This cylinder may be of the pneumatic or the hydraulic type. The connecting rod 28 is attached to the crank arm 26 and to the piston rod 29 by means of suitable clevises.

Figure 4 illustrates the apparatus made use of in the actuation of the shaft 20 to which the lifting arm 18 is keyed. The shaft 20 is suitably mounted in bearings provided in supporting abutments 31 mounted on the foundation. A crank arm 32 is keyed at one end to the shaft 20 and pivotally attached at the other end to one end of a connecting rod 33. The connecting rod is connected on its other end to the piston rod 34 of an actuating cylinder 35, which is similar in type and operation to the cylinder 30. Here again the cylinder is mounted on the foundation of the mill and the connecting rod 33 is suitably attached by means of clevises to the crank arm and the piston rod.

Figure 5 provides an enlarged perspective view of a unit of the invention and facilitates the understanding of its operation. It is to be realized that, although this view contains only one lifting arm 18, one camming arm 19 and one rocking arm 22, there are a series of these elements across the mechanism, all of similar shape and size and operating in the same manner.

The camming arm 19, best shown in Figure 6, is a flat, irregularly shaped member which is rotatably mounted on the shaft 20. Generally speaking, the arm is elongated and the shaft 20 passes through it in a position slightly removed from its center. It is provided with a curved edge 36 which is generally concentric with a point somewhat above the shaft 20 in the drawing. The curved edge 36 merges into a flat portion 51 which in turn meets a step portion 37 which provides a straight edge which is generally radial, and is of relatively short extent inwardly of the flat portion 51. The inner end of the step portion 37 merges with a straight edge portion 38 which is of considerable length and which resides at an obtuse angle to the step portion 37. This straight edge portion merges at its other end with another straight edge portion 39, there being a curved transition portion between the two. The portion 39 is inclined to a line passing from its outer extremity to the axis of the shaft 20; generally speaking, such a line would pass through the outer extremity of the portion 39, while the portion 39, if extended, would be approximately tangential to the shaft 20. This means that the portion 39 lies at an obtuse angle to the step portion 37. The camming arm 19 is rounded beyond the outer extremity of the portion 39 to form a finger portion 40. On the opposite side of the finger 40 from the portion 39 is a protuberance 41 to which the link 25 is pivotally attached. The remainder of the outline of the camming arm is of a shape which will avoid interference with the other parts of the mechanism; this portion of the arm does not take part in the function of the arm and its actual shape is immaterial.

The shape of the lifting arm 18 is probably best shown in Figure 7. Generally speaking, it is L-shaped and is keyed at the outer end of the short leg to the shaft 20 for motion therewith. It is provided with an upper straight portion 42 which constitutes almost the entire length of the longer leg and is generally parallel and shaped from a line tangential to the outer surface of the shaft 20. At its inner extremity it connects with a step surface 43 which is generally perpendicular to the straight portion 42 adjacent to its intersection therewith, but which curves away from the portion 42 in the extremity which is away from the said portion 42. The side of the lifting arm which is away from the straight portion 42 is also provided with a straight portion 44 which is slightly inclined to the portion 42 and approaches it at the end away from the connection with the shaft 20. The inner part of the straight portion 44 merges into a curved portion 45 which is approximately concentric with the intersection of the straight portion 42 and the step portion 43.

Referring to Figure 5, the rocking arm 22 is shown as mounted on supporting abutments 46 which extend upwardly and rearwardly from the discard rack 21. The arm 22 is generally L-shaped with the longer leg 47 extending generally horizontally and the shorter leg 48 extending downwardly therefrom. The arm is pivotally mounted on the abutments 46 for rocking movement about a horizontal axis. The rocking motion is limited by portions of the abutments 46 contacting the extremities of the legs of the arm. The balance is such that the arm normally rests with the outer end of the longer leg 47 striking the abutments, in which condition the upper edge of the arm is approximately horizontal. In the other extreme condition the upper edge is inclined downwardly toward the discard rack 21. The central portion of the downwardly-depending leg 48 of the arm is provided with a horizontally-extending pin 49. As can be observed from the drawing, the location of the parts is such that the finger 40 of the camming arm 19 can strike the pin 49 of the rocking arm when the arm 19 is rotated about the shaft 20.

In the operation of the mechanism, a bundle of billets may be dropped on the upper shuffle bars 13 of the billet skid apparatus 11. The apparatus unscrambles the billets and presents them to the roller conveyor 12 in a broadside motion for longitudinal travel therealong. The billets may, of course, arrive on the conveyor from a furnace if the mechanism under discussion is situated between the furnace and the first roll stand instead of between the billet skid apparatus and the furnace. When the billet is on the conveyor 12 and is coextensive with the mechanism 10 of the invention, the operator, by introducing or releasing pressure into the cylinders 30 and 35 and actuating the arms 18 and 19, is able either to position the billet so that it rests on a desired side or to discard the billet into the rack 21. He is also able to jar the billet to remove scale and the like, and he is able to turn the billet around so that he can examine it for various defects. The manner in which the apparatus is manipulated to accomplish these things is best understood from the description of its operation with particular sizes and shapes of elongate metallic material which follows.

Figures 9, 10, 11:
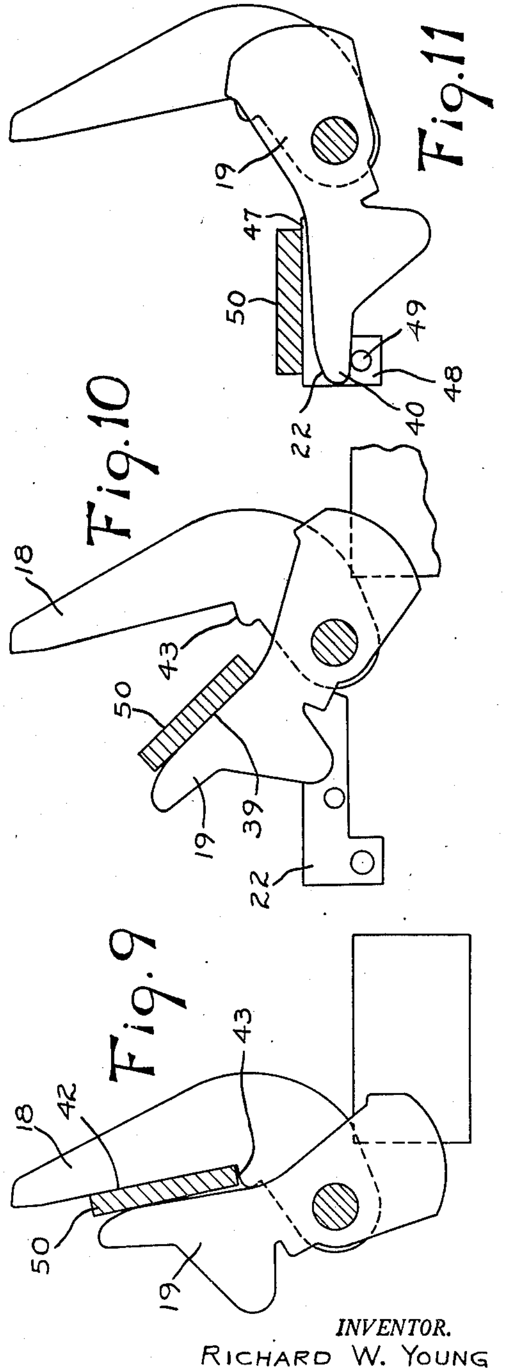

Figures 8 through 11 show the operation of the mechanism in discarding a slab. In Figure 8 a slab 50 is shown resting on the roller conveyor 12 as it is received from the billet skid apparatus or from a furnace. At this time the lifting arm 18 is in its lowermost position substantially below the surface of the roller conveyor, while the camming arm 19 is situated in an upright position with the portion 39 in a generally vertical plane. The operator, by control of the actuating fluid in the cylinder, moves the lifting arm 18 upwardly until it engages the underside of the slab 50. The lifting arm is moved upwardly still further and in a certain angular position the slab 50 slides downwardly toward the shaft 20 along the portion 42 of the arm on which it rests. The slab slides downwardly until it engages and rests on the step surface 43. The camming arm 19 is moved into a position wherein the portion 39 is inclined slightly away from the vertical and from the approaching lifting arm. The upward motion of the lifting arm continues until the slab 50 engages the portion 39 of the camming arm. The apparatus then appears as shown in Figure 9. Then, the operator moves the camming arm away from the lifting arm, the latter being retained in the position it was in when the slab engaged the camming arm. As the camming arm moves away from the lifting arm, the slab rests with one corner resting on the outer part of the portion 39 of the camming arm and the lower edge resting on the step surface 43 of the lifting arm. As the camming arm continues to move away from the lifting arm, the lower edge of the slab slides along the step surface 43 and drops downwardly onto the camming arm. The apparatus then has the aspect of Figure 10. The camming arm continues to move downwardly bearing with it the slab. Eventually in its downward travel, the finger portion 40 of the camming arm engages the pin 49 on the downwardly-depending leg 48 of the rocking arm 22. At this portion of the cycle of movement, the portion 39 of the camming arm is horizontal and on a level with the upper surface of the rocking arm. Further movement of the camming arm brings the portion 39 below the level of the rocking arm and the slab 50 rests, therefore, on the rocking arm. Continued movement of the camming arm downwardly results in the tipping of the rocking arm about its pivot, so that the upper surface thereof is inclined downwardly toward the discard racks. This situation is shown in Figure 11. Eventually, the movement of the camming arm acting on the pin 49 causes the rocking arm to tilt into a position wherein the slab slides off into the discard rack.

Figure 14:
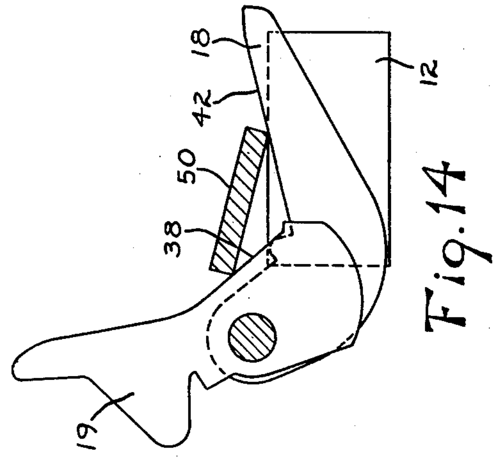
Figure 13:
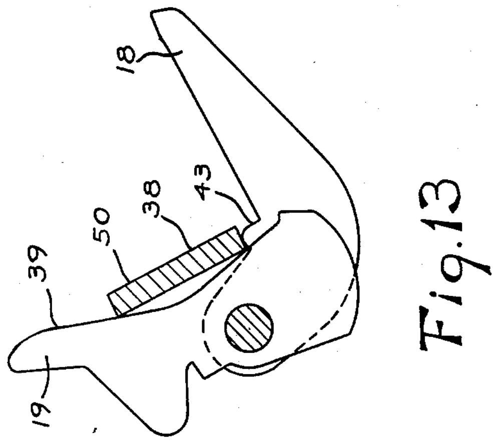
Figure 12:
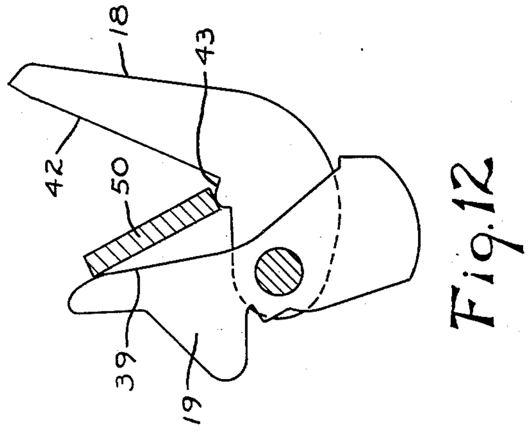
Figure 15:
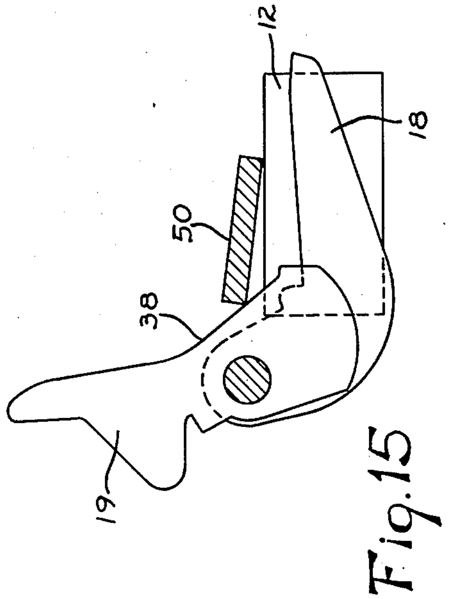

Figures 8, 9 and 12 through 17 illustrate the operation of the apparatus in turning over a slab. To begin with, the slab 50 rests on the roller conveyor 12 in exactly the same way as is shown in Figure 8, with the lifting and camming arms in the positions shown there. The operator causes the lifting arm 18 to move upwardly, to engage the slab, and to lift it upwardly until it contacts the portion 39 of the camming arm, which portion has been moved into a slightly inclined position. This, of course, is the situation illustrated in Figure 9. Then the operator moves the lifting arm backwardly in the direction from which it came. This leaves the upper edge of the slab resting against the portion 39 of the camming arm and the lower edge of the slab resting on the step surface 43, but situated on a part of the step surface away from the portion 42 of the lifting arm. As has been stated previously, this outward part of the step surface is curved and it is on this curved part that the edge of the slab rests. This phase of the operating cycle is shown in Figure 12. The operator continues to move the lifting arm downwardly and the upper edge of the slab continues to rest against the portion 39 of the camming arm. However, the lower edge of the slab is dragged over the curved part of the step surface and finally reaches the position shown in Figure 13, wherein the corner of the slab rests against the portion 38 of the camming arm and is prevented from sliding there along by the fact that it also rests against the outer curved part of the step portion. Further downward motion of the lifting arm by the operator results in the lower edge of the slab being pushed from the outer part of the step surface 43, whereupon the slab slides down the portion 39 of the camming arm and off the step surface onto the straight portion 42 of the lifting arm. At about this portion of the cycle, the lifting arm reaches the level of the roller conveyor 12 and, as the point of contact of slab on the portion 42 of the arm passes the level of the roller conveyor, the slab contacts the roller conveyor and is left behind. This situation is shown in Figure 14. Further downward movement of the lifting arm has no effect on the slab, since its lower edge now rests on the roller conveyor; however, during the portions of the cycle illustrated in Figures 14 and 15, the upper edge of the slab comes downwardly along the portion 39 of the camming arm and then along the portion 38. The cycle is performed very rapidly, so that the inertia of the slab carries it downwardly and, under ordinary circumstances, the slab, after reaching the condition shown in Figure 15, continues to slide downwardly until it rests wholly on the roller conveyor and is ready for longitudinal movement into the furnace or into the first roll stand. Under some conditions, however, it is perfectly possible that the slab will reach the condition of Figure 15 and remain there with one edge resting on the camming arm. This undesirable situation is corrected by moving the camming arm in a counter-clockwise direction. At first, the downward edge of the slab rests in a more or less fixed position on the roller conveyor, while the camming arm slides under the lower side of the slab and lifts it into a higher and higher angularity with respect to horizontal. At an intermediate point in this movement of the camming arm, the apparatus has the appearance shown in Figure 16, with the intersection of the flat portion 51 and the curved edge 36 pressing against the underside of the slab 50. Further movement of the camming arm in the same direction results in the situation shown in Figure 17, wherein the upper edge of the slab is cammed along the curved edge 36. As has been stated hereinbefore, the curved edge 36 has a center somewhat above the axis of the shaft 20 in the aspect of the camming arm shown in Figure 17; this means that points on the curved edge adjacent the flat portion 51 are situated further from the axis of the shaft 20 than are points on the curved edge in the parts thereof further away from the flat portion. Eventually, then, the slab will not only drop from off the camming arm onto the roller conveyor, but, in the process, will be pushed outwardly along the said roller conveyor.

When a bar, slab, or billet rests on the roller conveyor in a non-central position or at an angle to the direction of movement, this may be corrected by manipulation of the apparatus of the invention. When a slab, for instance, lies too close to the edge of the roller conveyor adjacent the apparatus of the invention, it may be nudged into a central position by moving the camming arm in the manner shown in Figures 15, 16 and 17. The camming arm is moved in a counter-clockwise direction, according to the view of the apparatus presented in Figure 15, so that the camming arm comes up underneath the edge of the slab and lifts it. The slab may rest with one edge on the roller conveyor and the other edge on the portion 38 of the camming arm. Further movement of the camming arm will result in the slab being dropped onto the roller conveyor in the desired position. The particular spot on the roller conveyor to which the slab falls is dependent, of course, on the particular shape of the camming arm and the relative positions of the roller conveyor and the apparatus of the invention. If, on the other hand, the slab rests on the roller conveyor in a position too far from the center thereof and away from the mechanism of the invention, it may be moved into a proper central position by use of the lifting arm. The lifting arm is moved upwardly, contacts the slab, and lifts it free of the conveyor. Further movement of the lifting arm brings about a condition wherein the slab rests on the straight portion 42 of the lifting arm, which portion is inclined. Thereupon the slab slides downwardly along the portion 42 until it strikes and comes to rest in contact with the step surface 42. The lifting arm is then moved back to its lowermost position, leaving the slab behind on the conveyor in the desired position. This latter position is determined by the distance from the shaft 20 to the step surface 43 and by the relative positions of the conveyor and the mechanism of the invention. Naturally, any slab, or other type of elongated metal article, which lies on the conveyor in a diagonal position can be moved to a central position which is aligned with the direction of movement by a combination of the operations described above.

The turning over of a square billet by means of the mechanism of the invention is accomplished in a somewhat different manner than would be used in the case of a slab. A billet 52 will rest on the conveyor in almost any conceivable position. The lifting arm is moved upwardly and engages the billet, carrying it upwardly. The billet slides down the portion 42 of the lifting arm in the manner described above in connection with the positioning of slabs and the like on the conveyor. The billet rests in the corner formed by the step surface 43 and the straight portion 42. The lifting arm is then moved to its lowermost position, leaving the billet behind on the conveyor in a definite position. This position, which is determined by the design of the apparatus, is in the exact spot through which passes the intersection of the step portion 37 of the camming arm and the portion 38 when it is at the level of the conveyor. The operator then moves the camming arm in a counter-clockwise direction and the corner of the billet is contacted by the step portion 37 of the camming arm. Further movement of the camming arm rolls the billet in the manner illustrated in Figure 18 and the side adjacent the side upon which it rested originally. By the repetition of this operation, it is possible to select the side most desirable for resting on the conveyor and, of course, to inspect all sides of the billet.

Figures 16, 17, 18, 19:
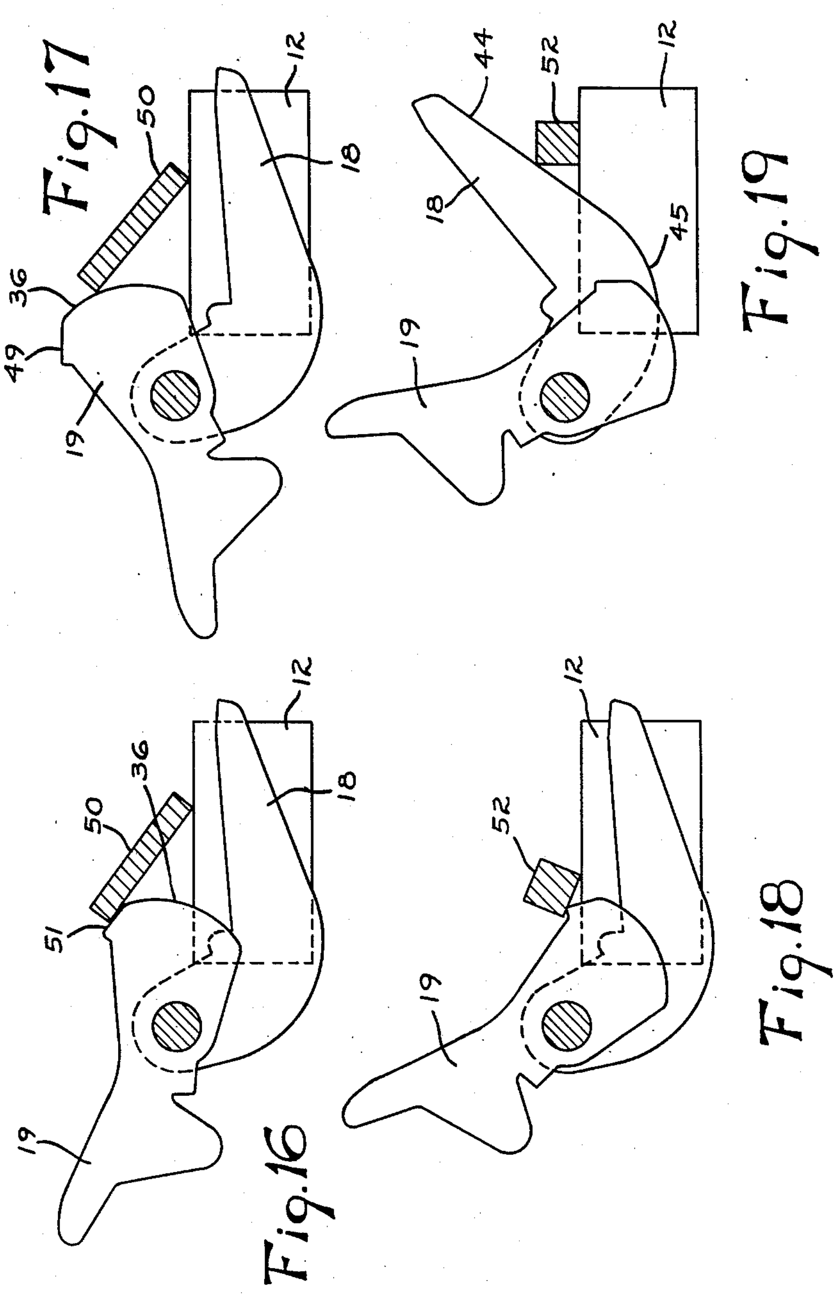

The manner in which billets and slabs may be manipulated by use of the mechanism of the invention is limited only by the imagination of the operator. For instance, another method of pushing billets and slabs transversely of the conveyor in a direction away from the mechanism is to make use of the lower edge of the lifting arm. This operation is illustrated in Figure 19. The lifting arm must be in a raised position before the billet enters the conveyor. After the billet is situated on the conveyor, the lifting arm is lowered. The lifting arm strikes the billet either with its curved portion 45 or the lower straight portion 44. In either case, continued downward movement of the lifting arm will push the billet away from the mechanism along the surface of the conveyor.

While certain novel features of the invention have been shown and described and are pointed out in the annexed claims, it will be understood that various omissions, substitutions and changes in the forms and details of the device illustrated and in its operation, may be made by those skilled in the art without departing from the spirit of the invention.

The invention having been thus described, what is claimed as new and desired to secure by Letters Patent is:

1. Apparatus for handling elongated metal members, comprising: a roller conveyor for moving said members horizontally and longitudinally, a discard and turnover mechanism arranged beside said conveyor for manipulating said members while retaining them in successive parallel position, a discard rack arranged beside said mechanism and on the side thereof away from the conveyor, a lifting arm associated with said mechanism and rotatably mounted for movement about an axis parallel to the conveyor direction, a camming arm associated with said mechanism and rotatably mounted for movement about an axis which is parallel to the conveyor direction, and a rocking arm adjacent to the discharge rack mounted for movement about an axis parallel to the conveyor direction.

2. Apparatus for handling elongated metal members, comprising: a roller conveyor for moving said members horizontally and longitudinally, a discard and turnover mechanism arranged beside said conveyor for manipulating said members while retaining them in successive parallel positions, a discard rack arranged beside said mechanism and on the side thereof away from the conveyor, a lifting arm associated with said mechanism and rotatably mounted for movement about a horizontal axis from a position beneath the working level of said conveyor to a position at a right angle thereto, a camming arm associated with said mechanism and rotatably mounted for movement about a horizontal axis from a position at a right angle to the working level of the conveyor to a position parallel thereto and extending in the opposite direction therefrom, and a rocking arm mounted adjacent the discard rack for transferring a metal member from the camming arm to the discard rack.

3. Apparatus for handling elongated metal members, comprising: a roller conveyor for moving said members horizontally and longitudinally, a discard and turnover mechanism arranged beside said conveyor for manipulating said members while retaining them in successive parallel positions, a discard rack arranged beside said mechanism on the side thereof away from the conveyor, a lifting arm associated with said mechanism rotatably mounted for movement about a horizontal axis, said lifting arm being capable of selective movement for lifting a member from the surface of the conveyor and carrying it to a position at a right angle thereto, a camming arm associated with said mechanism rotatably mounted for movement about a horizontal axis, said camming arm being capable of selective movement for carrying a member from a position at a right angle to the conveyor surface to a position adjacent the discard rack, and a rocking arm mounted adjacent the discard rack for movement about a horizontal axis, the rocking arm having a normally horizontal upper surface which is situated to receive a member from the camming arm and which inclines toward the discard rack during the movement of the camming arm adjacent thereto.

4. Apparatus as recited in claim 3, wherein: the lifting arm is generally L-shaped and is mounted with said axis passing perpendicularly through the outer extremity of the short leg, the longer leg having a straight portion on the side from which the short leg extends and a step surface extending at approximately a right angle from the said straight portion adjacent the short leg.

5. Apparatus as recited in claim 3, wherein: the camming arm is of generally flat, elongated shape with the axis of mounting passing perpendicularly intermediate the extremities, the side of the arm normally facing the conveyor being formed with two intersecting straight portions which extend at a large obtuse angle to each other, to form a slight concavity in the arm.

6. Mechanism for use with a horizontal roller conveyor, comprising: a first shaft rotatably mounted horizontally and perpendicularly to the axes of the rollers of the conveyor and at a level with the upper surface of the conveyor, a second shaft rotatably mounted parallel to said first shaft, a lifting arm of generally flat, L-shaped form fixedly mounted on said first shaft in a plane perpendicular thereto, with the shaft passing through the outer extremity of the shorter leg thereof, a camming arm of generally flat, elongated shape rotatably mounted on said first shaft in a plane perpendicular thereto, a first crank arm keyed at one end to said second shaft, a first pneumatic motor connected to the other end of said crank arm for the actuations thereof, a second crank arm keyed at one end to the second shaft, a link connected at one end to the camming arm and at the other end to the other end of said second crank arm, a third crank arm connected at one end to the first shaft, a second pneumatic motor connected to the outer end of the third crank arm for the actuation thereof, the said first pneumatic motor in moving from one end to another of its stroke causing the camming arm to move from a substantially vertical position to a substantially horizontal position, the second pneumatic motor in moving from one end to another of its stroke causing the lifting arm to move from a position wherein the longer leg is substantially vertical to a position wherein the longer leg is in a horizontal position on the opposite side of the first shaft from the horizontal position of the camming arm, and a rocking arm mounted for movement about a horizontal axis adjacent the camming arm in its horizontal position, the said rocking arm having a normally horizontal upper surface which is inclined by contact of the camming arm with the rocking arm in the said horizontal position.

7. Mechanism for manipulating billets and the like, comprising: a first shaft rotatably mounted horizontally, a second shaft rotatably mounted parallel to said first shaft and spaced horizontally therefrom at a lower level, a lifting arm of flat, L-shaped form keyed to said first shaft and extending generally perpendicularly therefrom with the shaft passing through the outer extremity of the shorter leg thereof, a camming arm of generally flat, elongated shape rotatably mounted on said first shaft and extending generally perpendicularly therefrom, a first crank arm keyed at one end to said second shaft, a first reciprocatory pneumatic motor having a piston rod connected to the other end of said crank arm for the actuation thereof, a second crank arm keyed at one end to the second shaft, a link connecting the camming arm to the other end of the second crank arm, a third arm connected at one end to the first shaft, a second reciprocatory pneumatic motor having a piston rod connected to the outer end of the third crank arm for the actuation thereof, the said first pneumatic motor in moving from one end to the other of its stroke causing the camming arm to move from a substantially vertical position to a substantially horizontal position, the second pneumatic motor in moving from one end to another of its stroke causing the lifting arm to move from a position wherein the longer leg is substantially horizontal and extending in the opposite direction than the camming arm in its horizontal position to a substantially vertical position, and rocking arm mounted for movement about an axis parallel to the aforementioned axes and adjacent to the camming arm when it is in its horizontal position, the said rocking arm having a pin extending horizontally therefrom and having a pin extending horizontally therefrom and having a normally horizontal upper surface which is inclined by contact of the camming arm with the pin during the movement of the arm into horizontal position.

8. Apparatus for handling elongated metal members, comprising: a conveyor for moving said members horizontally and longitudinally, a mechanism arranged beside said conveyor for manipulating said members while retaining them in successive substantially parallel positions, a discard apparatus arranged beside said mechanism on the side thereof away from the conveyor, a lifting arm associated with said mechanism rotatably mounted for movement about a horizontal axis, said lifting arm being capable of selective movement for lifting a member from the surface of the conveyor and carrying it to a position considerably removed therefrom, a camming arm associated with said mechanism rotatably mounted for movement about a horizontal axis, said camming arm being capable of selective movement for taking a member from the lifting arm and removing it to a position adjacent the discard apparatus, and a rocking arm mounted adjacent the discard apparatus for movement about a horizontal axis, the rocking arm having a normally horizontal upper surface which is situated to receive a member from the camming arm and which inclines toward the discard apparatus during the movement of the camming arm adjacent thereto.

9. Apparatus for handling elongated metal members, comprising: a roller conveyor for moving said members horizontally and longitudinally, a discard and turnover mechanism arranged beside said conveyor for manipulating said members while retaining them in successive parallel positions, a discard rack arranged beside said mechanism on the side thereof away from the conveyor, a lifting arm associated with said mechanism rotatably mounted for movement about a horizontal axis, said lifting arm being capable of selective movement for lifting a member from the surface of the conveyor and carrying it to a position at a right angle thereto, a camming arm associated with said mechanism rotatably mounted for movement about a horizontal axis, said camming arm being capable of selective movement for carrying a member from a position at a right angle to the conveyor surface to a position adjacent the discard rack, the lifting arm being generally L-shaped and being mounted with the said axis passing perpendicularly through the outer extremity of the short leg, the longer leg having a straight portion on the side from which the short leg extends and a step surface extending at approximately a right angle from the said straight portion adjacent the short leg.

10. Apparatus for handling elongated metal members, comprising: a roller conveyor for moving said members horizontally and longitudinally, a discard and turnover mechanism arranged beside said conveyor for manipulating said members while retaining them in successive parallel positions, a discard rack arranged beside said mechanism on the side thereof away from the conveyor, a lifting arm associated with said mechanism rotatably mounted for movement about a horizontal axis, said lifting arm being capable of selective movement for lifting a member from the surface of the conveyor and carrying it to a position at a right angle thereto, a camming arm associated with said mechanism rotatably mounted for movement about a horizontal axis, said camming arm being capable of selective movement for carrying a member from a position at a right angle to the conveyor surface to a position adjacent the discard rack, the camming arm being of generally flat, elongated shape with the axis of mounting passing perpendicularly intermediate the extremities, the side of the arm normally facing the conveyor being formed with two intersecting straight portions which extend at a large obtuse angle to each other, to form a slight concavity in the arm.

References Cited in the file of this patent

UNITED STATES PATENTS

| | | |
|---|---|---|
| 959,813 | Stevens | May 31, 1910 |
| 2,271,213 | Weidner | Jan. 27, 1942 |
| 2,527,024 | Mitchell | Oct. 24, 1950 |

FOREIGN PATENTS

| | | |
|---|---|---|
| 18,178 of 1888 | Great Britain | Sept. 12, 1889 |
| 256,417 | Germany | Feb. 11, 1913 |